US012626725B2

(12) United States Patent
Zheng et al.

(10) Patent No.: US 12,626,725 B2
(45) Date of Patent: May 12, 2026

(54) AUDIO/VIDEO PROCESSING METHOD AND APPARATUS, DEVICE, AND STORAGE MEDIUM

(71) Applicant: Beijing Zitiao Network Technology Co., Ltd., Beijing (CN)

(72) Inventors: Weiming Zheng, Beijing (CN); Cheng Li, Beijing (CN); Xuelun Fu, Beijing (CN); Yixiu Huang, Beijing (CN); Rui Xia, Beijing (CN); Xin Zheng, Beijing (CN); Lin Bao, Beijing (CN); Weisi Wang, Beijing (CN); Chen Ding, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/395,118

(22) Filed: Dec. 22, 2023

(65) Prior Publication Data

US 2024/0127860 A1     Apr. 18, 2024

Related U.S. Application Data

(63) Continuation of application No. PCT/CN2022/116650, filed on Sep. 2, 2022.

(30) Foreign Application Priority Data

Sep. 22, 2021    (CN) ........................... 202111109213.4

(51) Int. Cl.
*G11B 27/031*    (2006.01)
*G06F 3/16*    (2006.01)
*G10L 21/02*    (2013.01)

(52) U.S. Cl.
CPC ............ *G11B 27/031* (2013.01); *G06F 3/165* (2013.01); *G10L 21/02* (2013.01)

(58) Field of Classification Search
CPC ........ G11B 27/031; G06F 3/165; G10L 21/02
(Continued)

(56) References Cited

U.S. PATENT DOCUMENTS 11,366,854 B2 *  6/2022  Fu .......................... G06F 40/109
11,763,099 B1 *  9/2023  Oh ..................... H04N 21/4884
                                                                                704/3

(Continued)

FOREIGN PATENT DOCUMENTS

CN        103442300 A    12/2013
CN        105744346 A    7/2016
(Continued)

OTHER PUBLICATIONS

European Search Report for EP Patent Application No. 22871780.7, Issued on Aug. 30, 2024, 7 pages.

(Continued)

*Primary Examiner* — Helen Shibru

(57) ABSTRACT

Provided are an audio/video processing method and apparatus, a device, and a storage medium. The method comprises: displaying text data corresponding to an audio/video to be edited, wherein the text data has a mapping relation with an audio/video timestamp of said audio/video; displaying said audio/video according to a time axis track; in response to a preset operation triggered for target text data in the text data, determining an audio/video timestamp corresponding to the target text data as a target audio/video timestamp; and processing, on the basis of the preset operation, an audio/video clip corresponding to the target audio/video timestamp in said audio/video.

14 Claims, 4 Drawing Sheets

(58) Field of Classification Search
USPC .......................................................... 386/241
See application file for complete search history.

(56) References Cited

U.S. PATENT DOCUMENTS

| | | | | |
|---|---|---|---|---|
| 12,231,745 | B1 * | 2/2025 | Dubey ............... | H04N 21/8549 |
| 2007/0061728 | A1 * | 3/2007 | Sitomer ............... | G11B 27/034 |
| | | | | 704/E15.045 |
| 2007/0209499 | A1 * | 9/2007 | Kotani ................... | G10H 1/368 |
| | | | | 84/644 |
| 2014/0169767 | A1 * | 6/2014 | Goldberg ............... | G06Q 10/10 |
| | | | | 386/282 |
| 2019/0311331 | A1 | 10/2019 | Steinhoff et al. | |
| 2021/0043174 | A1 * | 2/2021 | Radin .................. | G10H 1/0041 |
| 2021/0133459 | A1 | 5/2021 | Wang et al. | |
| 2022/0415362 | A1 | 12/2022 | Jang | |
| 2023/0062137 | A1 * | 3/2023 | Golda ................... | G06F 3/0484 |
| 2024/0062443 | A1 * | 2/2024 | Sun ........................ | G11B 27/34 |
| 2024/0155092 | A1 | 5/2024 | Yang et al. | |
| 2025/0218441 | A1 * | 7/2025 | Chao ........................ | G10L 17/04 |

FOREIGN PATENT DOCUMENTS

| | | |
|---|---|---|
| CN | 107978310 A | 5/2018 |
| CN | 108259965 A | 7/2018 |
| CN | 110401878 A | 11/2019 |
| CN | 112102841 A | 12/2020 |
| CN | 112231498 A | 1/2021 |
| CN | 112243151 A | 1/2021 |
| CN | 112822542 A | 5/2021 |
| JP | H10-191248 A | 7/1998 |
| JP | 2004-287193 A | 10/2004 |
| JP | 2005260283 A | 9/2005 |
| JP | 2006-227363 A | 8/2006 |
| JP | 2007-295218 A | 11/2007 |
| KR | 10-2006-0130692 A | 12/2006 |
| WO | 2021/149929 A1 | 7/2021 |

OTHER PUBLICATIONS

MacPeople basic lipstick 2010, MacPeople, 2010, pp. 1-70.

Office action received from Chinese patent application No. 202111109213.4 mailed on Mar. 19, 2025, 18 pages (9 pages English Translation and 9 pages Original Copy).

Office action received from Japanese patent application No. 2023-578889 mailed on Mar. 4, 2025, 11 pages (6 pages English Translation and 5 pages Original Copy).

Office action received from Korean patent application No. 10-2023-7044829 mailed on Mar. 17, 2025, 15 pages (8 pages English Translation and 7 pages Original Copy).

International Search Report and Written Opinion for International Application No. PCT/CN202/116650, mailed Oct. 31, 2022, 11 Pages.

Office action received from Japanese patent application No. 2023-578889 mailed on Sep. 24, 2025, 6 pages (6 pages English Translation and 6 pages Original Copy).

* cited by examiner

AUDIO/VIDEO PROCESSING METHOD AND APPARATUS, DEVICE, AND STORAGE MEDIUM

CROSS-REFERENCE TO RELATED APPLICATIONS

The present application is a continuation application of International Application No. PCT/CN2022/116650, filed on Sep. 2, 2022, which claims priority to Chinese Patent Application No. 202111109213.4, entitled "AUDIO/VIDEO PROCESSING METHOD AND APPARATUS, DEVICE, AND STORAGE MEDIUM", filed on Sep. 22, 2021, the disclosure of both applications is incorporated by reference herein in their entirety.

TECHNICAL FIELD

The present disclosure relates to the field of data processing, and in particular to an audio video processing method, apparatus, device, and a storage medium.

BACKGROUND

With the increasing abundance of internet information, watching audio video has become an entertainment activity in daily life of people. In order to improve the watching experience of users, audio video clipping is an important part before various audio videos are published.

At present, in the process of audio video clipping, for some slight changes such as clipping of invalid words, a user usually listens to the audio video repeatedly and meanwhile finely adjusts the start point and the end point of time so as to clip the audio video. The operations are complex, and the accuracy of the audio video clipping needs to be improved.

SUMMARY

In order to solve the above technical problem or at least partially solve the above technical problem, an embodiment of the present disclosure provides an audio video processing method, which can improve the accuracy of audio video clipping and simplify user operations.

In a first aspect, the present disclosure provides an audio video processing method, including:

presenting text data corresponding to an audio video to be edited, wherein the text data has a mapping relationship with an audio video timestamp of the audio video to be edited; and presenting the audio video to be edited in accordance with a time axis track;

determining an audio video timestamp corresponding to target text data in the text data as a target audio video timestamp, in response to a preset operation triggered for the target text data;

processing an audio video clip corresponding to the target audio video timestamp in the audio video to be edited based on the preset operation.

In an optional implementation, the method further includes:

presenting a first edit entry for a preset keyword or a preset silence clip;

displaying the preset keyword or the preset silence clip in the text data in accordance with a preset second display style, in response to a trigger operation for the first edit entry.

In an optional implementation, the first edit entry corresponds to a first edit card, on which a one-click deletion control is provided. After the displaying the preset keyword or the preset silence clip in the text data in accordance with a preset second display style, in response to a trigger operation for the first edit entry, the method further includes:

deleting the preset keyword or the preset silence clip from the text data, in response to a trigger operation for the one-click deletion control.

In an optional implementation, the method further includes:

presenting a voice enhancement control on a second edit card;

performing an enhancement processing on human voice in the audio video to be edited, in response to a trigger operation for the voice enhancement control.

In an optional implementation, the method further includes:

determining background music corresponding to the audio video to be edited based on a musical genre of the audio video to be edited and/or a content in the text data corresponding to the audio video to be edited;

adding the background music to the audio video clip to be edited.

In an optional implementation, the method further includes:

presenting a loudness equalization control on a third edit card;

performing a normalization processing on loudness of a volume in the audio video to be edited, in response to a trigger operation for the loudness equalization control.

In an optional implementation, the method further includes:

presenting an intelligent teaser control on a fourth edit card;

adjusting a music volume and a human voice volume in an audio video clip in the audio video to be edited within a previous preset time period, in response to a trigger operation for the intelligent teaser control, so as to obtain an audio video clip with adjusted volume, wherein the music volume is inversely proportional to the human voice volume in the audio video clip with adjusted volume.

In an optional implementation, the preset operation includes a selection operation, and the processing an audio video clip corresponding to the target audio video timestamp in the audio video to be edited based on the preset operation includes:

displaying the audio video clip corresponding to the target audio video timestamp in the audio video to be edited in accordance with a preset first display style.

In an optional implementation, the preset operation includes a deletion operation, and the processing an audio video clip corresponding to the target audio video timestamp in the audio video to be edited based on the preset operation includes:

deleting the audio video clip corresponding to the target audio video timestamp in the audio video to be edited based on the deletion operation.

In an optional implementation, the preset operation includes a modification operation, and the processing an audio video clip corresponding to the target audio video timestamp in the audio video to be edited based on the preset operation, includes:

acquiring modified text data corresponding to the modification operation;

generating an audio video clip based on the modified text data and tone color information in the audio video to be edited, as an audio video clip to be modified;

performing replacement processing on the audio video clip corresponding to the target audio video timestamp in the audio video to be edited, by utilizing the audio video clip to be modified.

In an optional implementation, the method further includes:

upon receiving an addition operation for first text data in the text data, generating a first audio video clip based on the first text data and tone color information in the audio video to be edited;

determining a first audio video timestamp corresponding to the first text data, based on position information of the first text data in the text data;

adding the first audio video clip to the audio video to be edited, based on the first audio video timestamp.

In a second aspect, the present disclosure also provides an audio video processing apparatus, including:

a first presentation module for presenting text data corresponding to an audio video to be edited, wherein the text data has a mapping relationship with an audio video timestamp of the audio video to be edited;

a second presentation module for presenting the audio video to be edited in accordance with a time axis track;

a determination module for determining an audio video timestamp corresponding to target text data in the text data as a target audio video timestamp, in response to a preset operation triggered for the target text data;

an edition module for processing an audio video clip corresponding to the target audio video timestamp in the audio video to be edited, based on the preset operation.

In a third aspect, the present disclosure provides a computer readable storage medium having stored therein instructions that, when being executed on a terminal device, cause the terminal device to implement the above-mentioned method.

In a fourth aspect, the present disclosure provides a device, including: a memory, a processor, and a computer program stored on the memory and executable on the processor, the processor implementing the above-mentioned method when executing the computer program.

In a fifth aspect, the present disclosure provides a computer program product, the computer program product comprising a computer program/instructions that, when being executed by a processor, implement the above-mentioned method.

Compared with the related art, the technical solution provided by the embodiment of the present disclosure has the following advantages.

The embodiment of the present disclosure provides an audio video processing method, which presents text data corresponding to an audio video to be edited, determines an audio video timestamp corresponding to target text data in the text data as a target audio video timestamp, in response to a preset operation triggered for the target text data, and processes an audio video clip corresponding to the target audio video timestamp in the audio video to be edited based on the preset operation. It can be learned that, the audio video processing method provided by the embodiment of the present disclosure can improve accuracy of audio video clipping, simplify the user operations, and lower the bar for the user operation.

BRIEF DESCRIPTION OF THE DRAWINGS

The accompanying drawings here, which are incorporated in and constitute a part of this specification, illustrate embodiments consistent with the present disclosure and, together with the specification, serve to explain the principles of the present disclosure.

In order to more clearly illustrate the embodiments of the present disclosure or technical solutions in the related art, the drawings for use in the description of the embodiments or the related art will be briefly introduced below. It is obvious for those skilled in the art to further obtain other drawings based on these drawings without making inventive efforts.

DETAILED DESCRIPTION

In order that the above objects, features and advantages of the present disclosure can be more clearly understood, solutions of the present disclosure will be further described below. It should be noted that, in the case of no conflict, the embodiments and features in the embodiments of the present disclosure can be combined with each other.

In the following description, numerous specific details are set forth in order to provide a thorough understanding of the present disclosure, but the present disclosure can also be implemented otherwise than as described herein. It is obvious that the embodiments in the specification are only a portion of the embodiments of the present disclosure, and not all embodiments.

Figure 1:
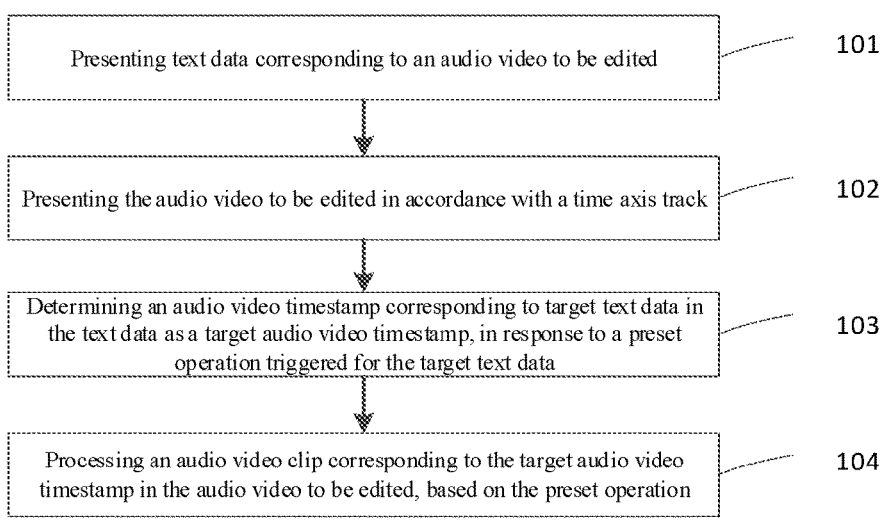
FIG. 1 is a flow diagram of an audio video processing method provided in an embodiment of the present disclosure.

An embodiment of the present disclosure provides an audio video processing method. With reference to FIG. 1, is shown a flow diagram of the audio video processing method provided in the embodiment of the present disclosure, the method including:

S101: presenting text data corresponding to an audio video to be edited.

The text data has a mapping relationship with an audio video timestamp of the audio video to be edited, and the audio video timestamp is used for indicating the playing time of each frame of audio video.

In the embodiment of the present disclosure, the audio video to be edited includes, but not limited to, an audio video obtained by recording, an audio video obtained based on a script, and the like. The text data can be obtained by performing voice recognition on the audio video to be edited, or can be a script. In case where the text data is the script, the text data can be matched with the audio video to be edited to obtain the above-mentioned mapping relationship between the text data and an audio video timestamp of the audio video to be edited. The voice recognition method includes but is not limited to an Automatic Speech Recognition (ASR) technology.

Figure 2:
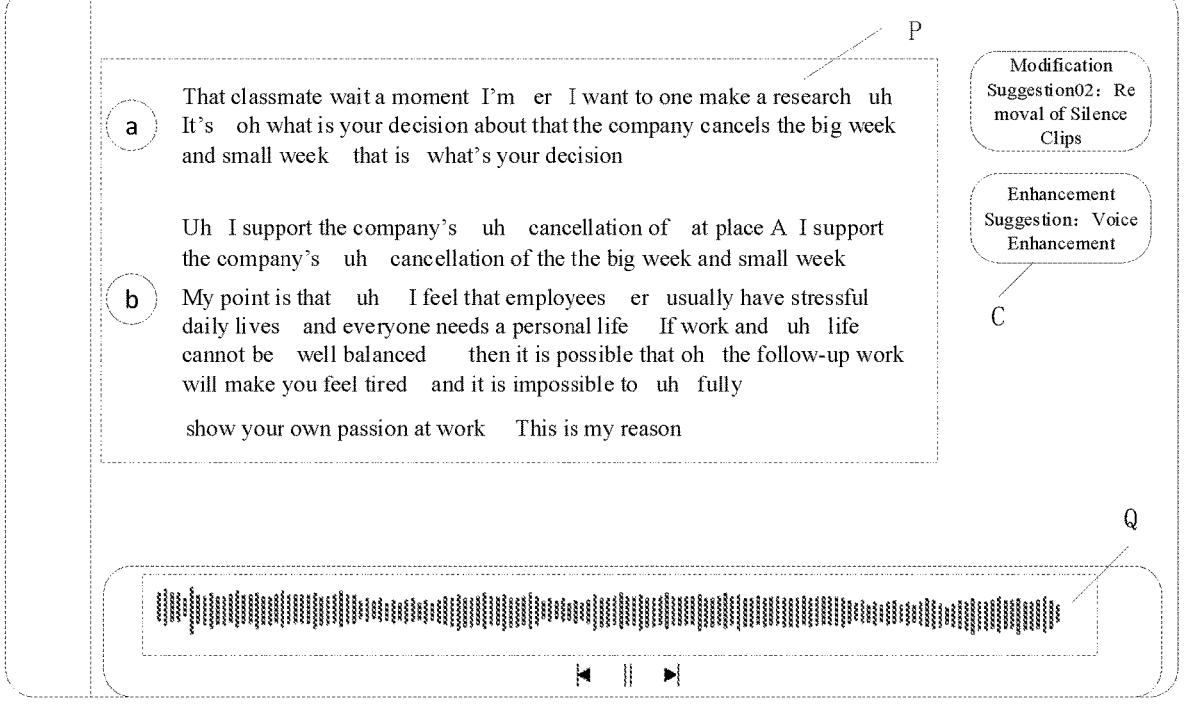
FIG. 2 is a schematic diagram of an audio video processing interface provided in an embodiment of the present disclosure.

In the present embodiment, the text data can be presented on an interface. As an example, the interface is, for example, as shown in FIG. 2. A region P in FIG. 2 shows the presented text data. In case where the audio video to be edited contains voices of different users, text data of the different users, such as the text data of user a and user b presented in FIG. 2, can be determined.

S102: presenting the audio video to be edited in accordance with a time axis track.

In the present embodiment, the audio video to be edited can be presented on an interface according to a time axis track. As an example, a region Q in FIG. 2 shows the presented audio video to be edited.

It should be noted that the order for performing step 102 is not limited in particular.

S103: determining an audio video timestamp corresponding to target text data in the text data as a target audio video timestamp, in response to a preset operation triggered for the target text data.

In the present embodiment, the preset operation includes, but is not limited to, a selection operation, a deletion operation, and a modification operation. Because the text data has a mapping relationship with the audio video timestamp of the audio video to be edited, the target audio video timestamp corresponding to the target text data can be determined according to the mapping relationship, for the target text data in the text data.

S104: processing an audio video clip corresponding to the target audio video timestamp in the audio video to be edited based on the preset operation.

In the embodiment of the present disclosure, the corresponding audio video clip in the audio video to be edited can be determined based on the audio video timestamp, the audio video clipping can be realized based on the text by processing the audio video clip corresponding to the target audio video timestamp in the audio video to be edited, and the audio video clipping can be realized with high accuracy by clipping the corresponding audio video clip in linkage with clipping the text.

In an optional implementation, if the preset operation includes a selection operation, then processing an audio video clip corresponding to the target audio video timestamp in the audio video to be edited based on the preset operation includes: displaying an audio video clip corresponding to the target audio video timestamp in the audio video to be edited according to a preset first display style.

Figure 3:
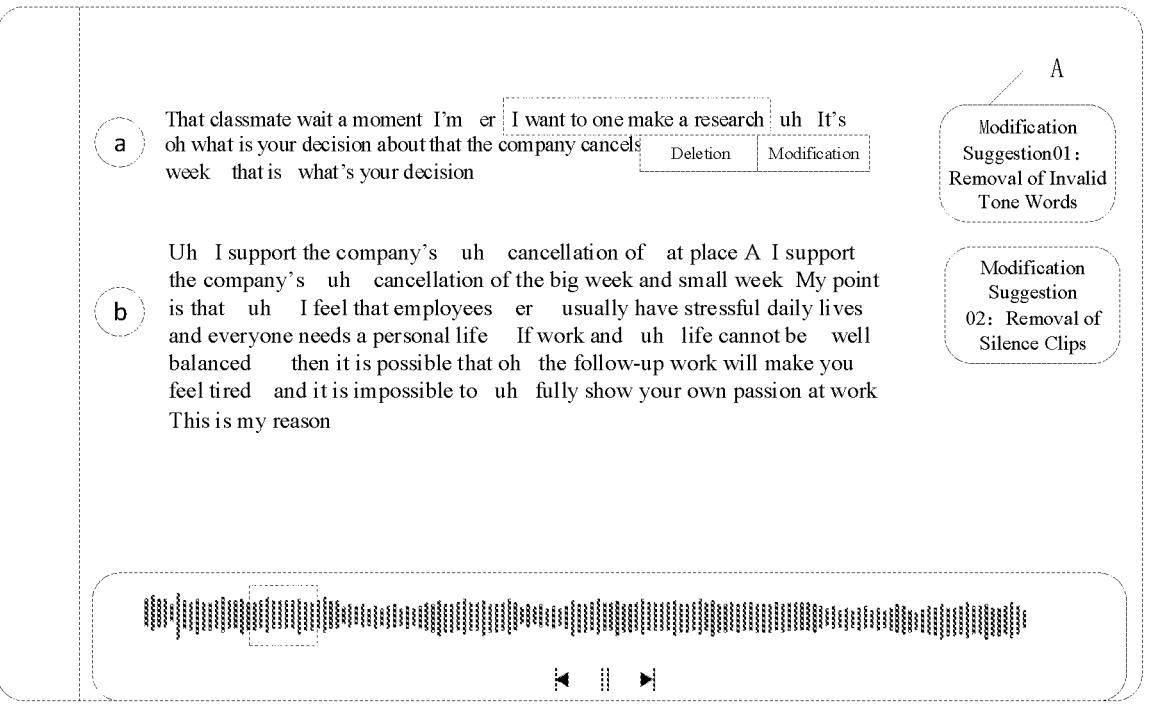
FIG. 3 is a schematic diagram of another audio video processing interface provided in an embodiment of the present disclosure.

As an example, the first display style is, for example, highlighting. FIG. 3 shows a schematic diagram of another interface. With reference to FIG. 3, the target text data can be highlighted based on a selection operation, and the audio video clip corresponding to the target audio video timestamp can be highlighted based on a time axis track, where the highlighted portion is shown as a dotted line portion in FIG. 3.

In an optional implementation, if the preset operation includes a deletion operation, then processing an audio video clip corresponding to the target audio video timestamp in the audio video to be edited based on the preset operation includes: deleting the audio video clip corresponding to the target audio video timestamp in the audio video to be edited based on the deletion operation.

Based on the deletion operation, the target text data can be deleted, and the audio video clip corresponding to the target audio video timestamp can be deleted. For example, as shown in FIG. 3, after the target text data is selected, a deletion control can be presented, and the target text data and the audio video clip corresponding to the target audio video timestamp are deleted in response to a trigger operation for the deletion control.

In an optional implementation, if the preset operation includes a modification operation, then processing an audio video clip corresponding to the target audio video timestamp in the audio video to be edited based on the preset operation includes: acquiring modified text data corresponding to the modification operation; generating an audio video clip based on the modified text data and tone color information in the audio video to be edited, as an audio video clip to be modified; performing a replacement processing on the audio video clip corresponding to the target audio video timestamp in the audio video to be edited, by utilizing the audio video clip to be modified.

Based on the modification operation, the target text data can be modified. For example, as shown in FIG. 3, after the target text data is selected, a modification control may be presented, modified text data is generated according to the received modified content in response to a trigger operation for the modification control. An audio video clip to be modified is generated based on the modified text data and the tone color information, and the audio video clip corresponding to the target audio video timestamp is replaced with the audio video clip to be modified, so as to realize a modification to the audio video to be edited.

The audio video processing method provided in the embodiment of the present disclosure includes: presenting text data corresponding to an audio video to be edited, determining an audio video timestamp corresponding to target text data in the text data as a target audio video timestamp in response to a preset operation triggered for the target text data, and processing an audio video clip corresponding to the target audio video timestamp in the audio video to be edited based on the preset operation. It can be learned that, the audio video processing method provided in the embodiment of the present disclosure can clip the audio video based on the text; since the text has a mapping relationship with the audio video timestamp, the audio video clipping can realized with high accuracy by clipping the audio video clip in linkage with clipping the corresponding text; and the audio video content can be visually presented by presenting the text data having the mapping relationship with the audio video timestamp. Compared with the solution in the related art for users to clip the audio video content, the method simplifies user operations and lowers the bar for user operations.

Based on the above-mentioned embodiment, in an audio video processing scene, in order to improve the auditory sense experience, there are requirements for multiple functions such as clipping of invalid tone words, background music, production of teasers and the like. According to the method of the embodiment of the present disclosure, the above-mentioned functions can be conveniently realized, and the bar for user's use can be lowered, which are described as follows.

In an optional implementation, invalid tone words such as "uh", "er" and "that" as well as silence clips usually occur in a dialog, so there is a requirement for editing the audio video to be edited to delete the above invalid tone words and silence clips, in order to ensure the continuity of the dialog.

Figure 4:
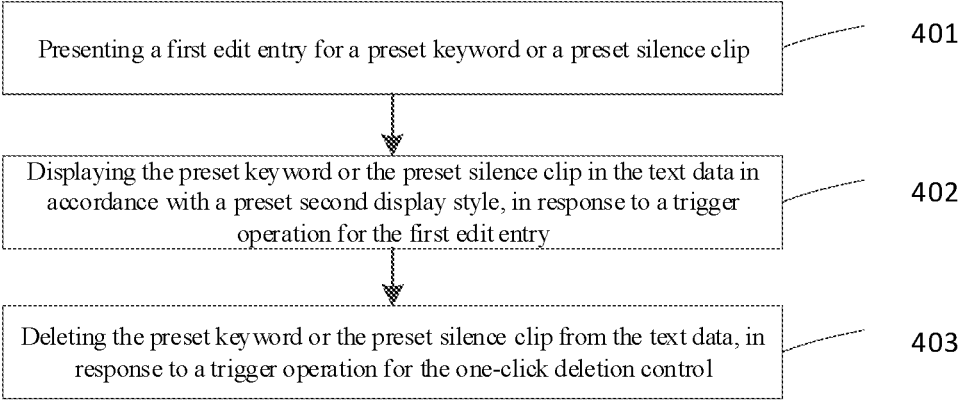
FIG. 4 is a flow diagram of another audio video processing method provided in an embodiment of the present disclosure.

Therefore, as shown in FIG. 4, the audio video processing method according to the embodiment of the present disclosure further includes:

step 401: presenting a first edit entry for a preset keyword or a preset silence clip.

In the present embodiment, it is possible to detect text data corresponding to the presented audio video to be edited, determine a preset keyword or a preset silence clip in the text data, and present the first edit entry in the case where there is a preset keyword or a preset silence clip in the text data. As an example, the control shown in region A of FIG. 3 is a first edit entry, on which information "Modification Suggestion 01: Removal of Invalid Tone Words" is presented.

The preset keyword can include the invalid tone word and other words. There are various implementations for determining the preset keyword in the text data, for example, the preset keyword in the text data can be determined by means of matching, and then, for example, the preset keyword in the text data can be determined based on a natural language processing technology.

The preset silence clip is determined according to an interval between audio video timestamps corresponding to two adjacent characters. For example, in case if the interval is greater than a preset threshold, it is determined that a preset silence clip exists between the two adjacent characters. The silence clip can be presented in form of a space on the interface, and alternatively, a length to present the silence clip can be determined according to a value of the interval.

Step 402: displaying the preset keyword or the preset silence clip in the text data in accordance with a preset second display style, in response to a trigger operation for the first edit entry.

The trigger operation for the first edit entry includes but is not limited to a click operation, a voice instruction, a touch track. The second display style may be highlighting or a display style in other form, which is not specifically limited here.

Figure 5:
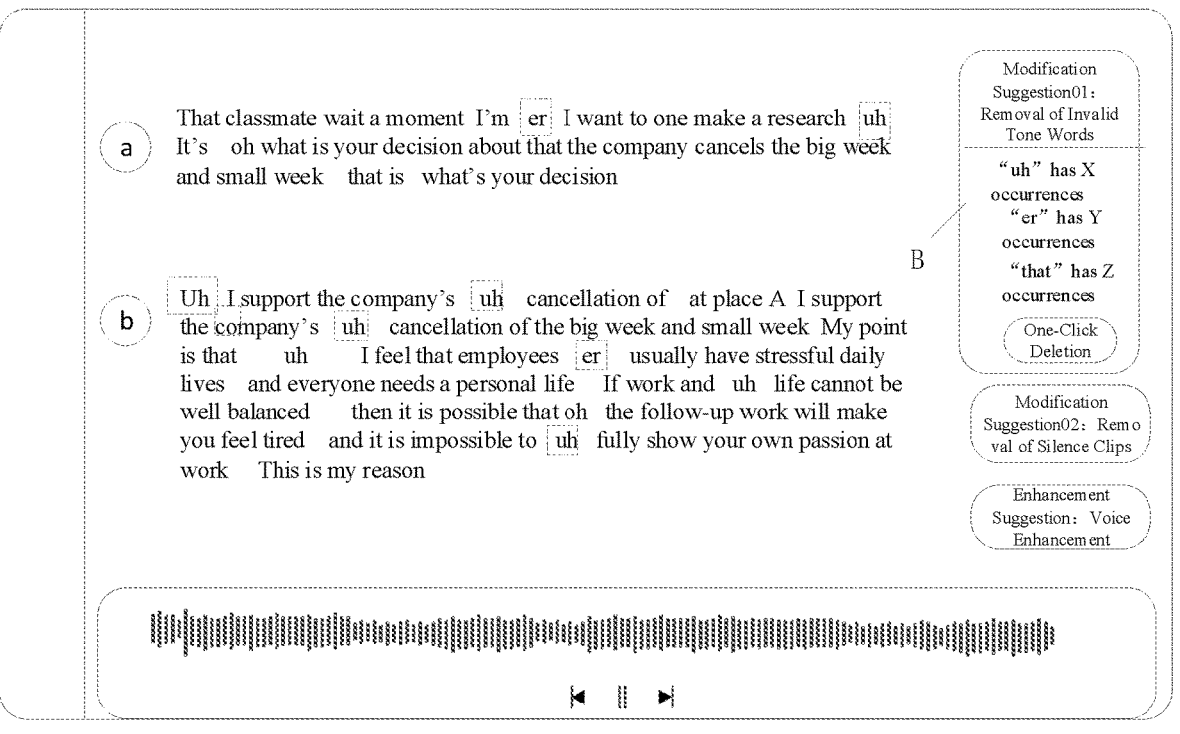
FIG. 5 is a schematic diagram of another audio video processing interface provided in an embodiment of the present disclosure.

FIG. 5 is a schematic diagram of an interface. In FIG. 5, the preset keywords "er", "en" and "that" are highlighted on the interface, as shown by the dotted line portion.

Step 403: deleting the preset keyword or the preset silence clip from the text data, in response to a trigger operation for the one-click deletion control.

In the embodiment of the present disclosure, the first edit entry corresponds to a first edit card, on which a one-click deletion control is provided. The first edit card is presented in response to the trigger operation for the first edit entry, wherein the first edit card can be presented in forms including but not limited to a pull-down option, a floating window and the like.

For example, with reference to FIG. 5, the first edit card is shown in region B of FIG. 5. Occurrences can be counted for each preset keyword, and the preset keyword and the corresponding number of occurrences can be presented in the first edit card.

Optionally, in response to a trigger operation for a target keyword in the preset keyword, the target keyword is removed from the preset keyword, and the number of occurrences of the preset keyword presented in the first edit card is synchronously modified, so that a user can remove the keyword which does not belong to the invalid tone words by a click or other operation, thus preventing the keyword from being deleted by one click.

In the present embodiment, a deletion operation of the preset keyword or the preset silence clip can be presented in form of edit card, which provides a one-click operation, saves the edit time, simplifies the user operations, and lower the bar for the user's usage.

In an optional implementation, the audio video processing method further includes: presenting a voice enhancement control on a second edit card; performing enhancement processing on human voice in the audio video to be edited, in response to a trigger operation for the voice enhancement control.

In the present embodiment, a second edit entry for an audio video to be edited is presented, where the second edit entry corresponds to a second edit card, on which a voice enhancement control is provided. For example, noise detection can be carried out based on the audio video to be edited, and in the case where noise is detected, the second edit entry is presented. As an example, a control shown in region C of FIG. 2 is the second edit entry, on which information "Reinforcement Suggestion: Voice Enhancement" is presented. And then, the second edit card is presented in response to the trigger operation for the second edit entry.

Figure 6:
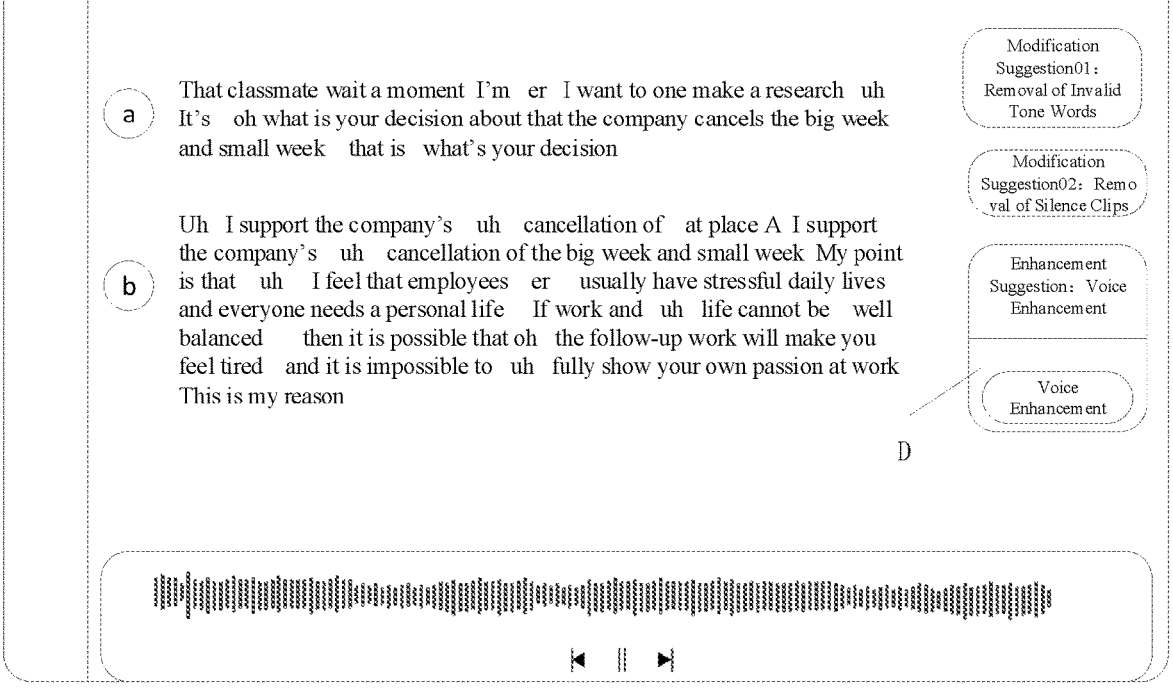
FIG. 6 is a schematic diagram of another audio video processing interface provided in an embodiment of the present disclosure.

With reference to FIG. 6, the second edit card is as shown in region D of FIG. 6, on which a voice enhancement control "Enhancement of Voice" is presented. Enhancement processing is performed on human voice in the audio video to be edited, in response to a trigger operation for the voice enhancement control, where the trigger operation includes, but is not limited to, a click operation, a voice instruction, and a touch track.

In the present embodiment, the voice enhancement operation can be presented in form of edit card so as to provide a one-click operation, and humane voice of a user can be enhanced to satisfy the auditory sense experience, simplify the user operations, and lower the bar of the user's usage.

In an optional implementation, the audio video processing method further includes: determining background music corresponding to the audio video to be edited, based on a musical genre of the audio video to be edited and/or a content in text data corresponding to the audio video to be edited; adding the background music to the audio video clip to be edited.

In the present embodiment, a plurality of tags can be preset, each of which has a mapping relationship with one or more background music, a tag corresponding to a musical genre and/or a content in text data is determined based on the musical genre of the audio video to be edited and/or the content in the text data corresponding to the audio video to be edited, and then background music corresponding to the audio video to be edited is determined based on the mapping relationship between the tag and the background music.

As an example, for the content in the text data corresponding to the audio video to be edited, a theme of the content is determined as "motion" based on the natural language processing technology, and then background music corresponding to the tag "motion" is determined as background music corresponding to the audio video to be edited, and the background music is added to the audio video clip to be edited.

As another example, a corresponding tag is determined based on the musical genre of the audio video to be edited, background music corresponding to the tag is used as the background music corresponding to the audio video to be edited, and then the background music is added to the audio video clip to be edited.

In the present embodiment, background music can be intelligently recommended based on the content and the genre of text data so as to meet the requirement for the scene to which the background music is added, enrich the variety of the auditory sense, improve the auditory sense experience, simplify the user operations and lower then bar for user's usage.

In an optional implementation, the audio video processing method further includes: presenting a loudness equalization control on a third edit card; performing normalization processing on loudness of a volume in the audio video to be edited, in response to a trigger operation for the loudness equalization control.

In the present embodiment, a third edit entry for an audio video to be edited is presented, where the third edit entry corresponds to a third edit card, on which a loudness equalization control is provided. For example, loudness detection of the volume can be performed based on the audio video to be edited, and the third edit entry is presented in case where it is detected that the audio video to be edited does not satisfy a preset loudness equalization condition. Then, the third edit card is presented in response to a trigger operation for the third edit entry, and normalization processing is performed on loudness of the volume in the audio video to be edited in response to a trigger operation for the loudness equalization control, for example, to make the loudness of the volume in the audio video to be edited within a preset range.

In the present embodiment, it is possible to present the loudness equalization operation in the form of edit card, so as to provide a one-click operation, and it is possible to enhance the auditory sense experience, simplify the user operations, and lower the bar for user's usage.

In an optional implementation, the audio video processing method further includes: presenting an intelligent teaser control on a fourth edit card; adjusting a music volume and a human voice volume in an audio video clip in the audio video to be edited within a previous preset time period, in response to a trigger operation for the intelligent teaser control, so as to obtain an audio video clip with an adjusted volume.

In the present embodiment, a fourth edit entry for the audio video to be edited is presented, where the fourth edit entry corresponds to a fourth edit card, on which an intelligent teaser control is provided. The fourth edit card is presented in response to a trigger operation for the fourth edit entry, and a music volume and a human voice volume in an audio video clip in the audio video to be edited within a previous preset time period are adjusted, in response to a trigger operation for the intelligent teaser control, for example, the human voice volume is increased by a first volume value and the music volume is decreased by a second volume value, or the music volume is decreased by a third volume value in the audio video clip in which human voice is detected, so as to obtain the audio video clip with an adjusted volume.

The music volume is inversely proportional to the human voice volume in the audio video clip with the adjusted volume.

Optionally, it is also possible to realize generation of an opening based on the intelligent teaser control presented on the fourth edit card. For example, the currently selected second text data and a second audio video clip corresponding to the second text data are determined in response to a trigger operation for the intelligent teaser control, and the second text data and the second audio video clip are copied and pasted to a preset opening region, so as to realize the effect of the teaser.

In the present embodiment, it is possible to present functions of an intelligent teaser in form of edit card, so as to provide a one-click operation, which can realize the effect of the teaser, simplify the user operations, and lower the bar for the user's usage.

In an optional implementation, the audio video processing method further includes: upon receiving an addition operation for first text data in text data, generating a first audio video clip based on the first text data and tone color information in the audio video to be edited; determining a first audio video timestamp corresponding to the first text data based on position information of the first text data in the text data; adding the first audio video clip to the audio video to be edited based on the first audio video timestamp.

In the present embodiment, the first text data can be obtained in response to an input operation, or can be obtained by copying based on the existing text data. Tone color information of each user can be obtained according to the audio video to be edited. When adding the first text data, a corresponding first audio video timestamp is determined according to position information of the first text data in the text data and a first audio video clip is added at the position of the first audio video timestamp.

It should be noted that the above-mentioned edit entry can be automatically presented based on a detection result, or can be presented on an interface in response to a trigger operation.

In the present embodiment, the tone color cloning and voice broadcasting technologies are adopted to clone tone color and intelligently generate audio video clip based on the added text, so that the audio video clips are added based on text input, the time cost and the editing cost resulting from re-recording are reduced, and the user operations are simplified.

Figure 7:
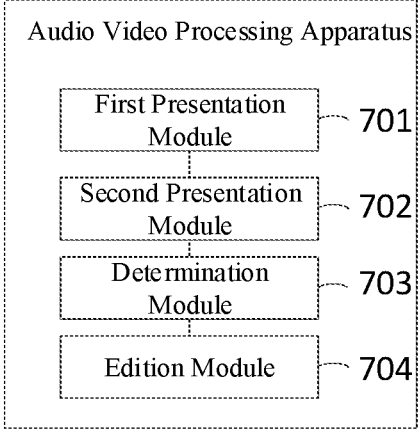
FIG. 7 is a schematic structural diagram of an audio video processing apparatus provided in an embodiment of the present disclosure.

Based on the above-mentioned method embodiment, the present disclosure further provides an audio video processing apparatus. With reference to FIG. 7, is shown a schematic structural diagram of an audio video processing apparatus provided in the embodiment of the present disclosure, the apparatus including:

a first presentation module 701 for presenting text data corresponding to an audio video to be edited, wherein, the text data has a mapping relationship with an audio video timestamp of the audio video to be edited;

a second presentation module 702 for presenting the audio video to be edited in accordance with a time axis track;

a determination module 703 for determining an audio video timestamp corresponding to the target text data in the text data as a target audio video timestamp, in response to a preset operation triggered for target text data;

an edition module 704 for processing an audio video clip corresponding to the target audio video timestamp in the audio video to be edited, based on the preset operation.

In an optional implementation, the audio video processing apparatus further includes:

a first processing module for presenting a first edit entry for a preset keyword or a preset silence clip; and displaying the preset keyword or the preset silence clip in the text data in accordance with a preset second display style, in response to a trigger operation for the first edit entry.

In an optional implementation, the first edit entry corresponds to a first edit card, on which a one-click deletion control is provided. The first edition module is further used for deleting the preset keyword or the preset silence clip from the text data, in response to a trigger operation for the one-click deletion control.

US 12,626,725 B2

11

In an optional implementation, the audio video processing apparatus further includes:

a second processing module for presenting a voice enhancement control on a second edit card; and performing enhancement processing on human voice in the audio video to be edited, in response to a trigger operation for the voice enhancement control.

In an optional implementation, the audio video processing apparatus further includes:

a first addition module for determining background music corresponding to the audio video to be edited, based on a musical genre of the audio video to be edited and/or a content in text data corresponding to the audio video to be edited; and adding the background music to the audio video clip to be edited.

In an optional implementation, the audio video processing apparatus further includes:

a third processing module for presenting a loudness equalization control on a third edit card; and performing normalization processing on loudness of volume in the audio video to be edited, in response to a trigger operation for the loudness equalization control.

In an optional implementation, the audio video processing apparatus further includes:

a fourth processing module for presenting an intelligent teaser control on a fourth edit card; and adjusting a music volume and a human voice volume in an audio video clip in the audio video to be edited within a previous preset time period, in response to a trigger operation for the intelligent teaser control, so as to obtain an audio video clip with an adjusted volume, wherein the music volume is inversely proportional to the human voice volume in the audio video clip with the adjusted volume.

In an optional embodiment, the preset operation includes a selection operation, and the edition module 704 is specifically used for displaying an audio video clip corresponding to the target audio video timestamp in the audio video to be edited, in accordance with a preset first display style.

In an optional embodiment, the preset operation includes a deletion operation, and the edition module 704 is specifically used for deleting the audio video clip corresponding to the target audio video timestamp in the audio video to be edited, based on the deletion operation.

In an optional embodiment, the preset operation includes a modification operation, and the edition module 704 is specifically used for acquiring modified text data corresponding to the modification operation; generating an audio video clip based on the modified text data and tone color information in the audio video to be edited, as an audio video clip to be modified; and performing replacement processing on the audio video clip corresponding to the target audio video timestamp in the audio video to be edited by utilizing the audio video clip to be modified.

In an optional implementation, the audio video processing apparatus further includes:

a second addition module for generating, upon receiving an addition operation for first text data in the text data, a first audio video clip based on the first text data and tone color information in the audio video to be edited; determining a first audio video timestamp corresponding to the first text data, based on position information of the first text data in the text data; and adding the first audio video clip to the audio video to be edited, based on the first audio video timestamp.

The explanations for the audio video processing method in the above-mentioned embodiment are also applicable to the audio video processing apparatus of the present embodiment, and details are not described here.

The audio video processing apparatus provided in the embodiment of the present disclosure presents text data corresponding to an audio video to be edited, determines an audio video timestamp corresponding to target text data in the text data as a target audio video timestamp in response to a preset operation triggered for the target text data, and processes an audio video clip corresponding to the target audio video timestamp in the audio video to be edited based on the preset operation. It can be learned that, the audio video processing method provided in the embodiment of the present disclosure can clip the audio video based on the text; since the text has a mapping relationship with the audio video timestamp, the audio video clipping can be realized with high accuracy by clipping the corresponding audio video clip in linkage with clipping the text; and the audio video content can be visually presented by presenting the text data having the mapping relationship with the audio video timestamp. Compared with the solution regarding that the user clips the audio video content in the related art, the method simplifies the user operations and lower the bar for user operation.

In addition to the above-mentioned method and apparatus, an embodiment of the present disclosure further provides a computer readable storage medium, the computer readable storage medium having stored therein instructions that, when being executed on a terminal device, cause the terminal device to implement the audio video processing method according to the embodiment of the present disclosure.

An embodiment of the present disclosure further provides a computer program product, the computer program product including a computer program/instructions that, when being executed by a processor, implement the audio video processing method according to the embodiment of the present disclosure.

Figure 8:
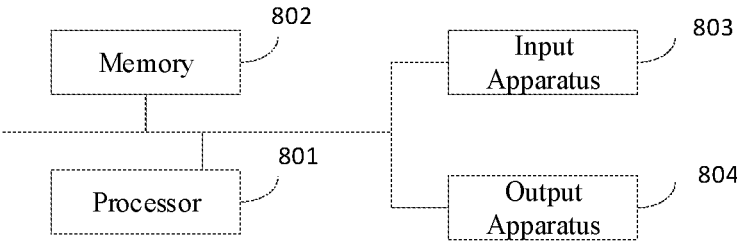
FIG. 8 is a schematic structural diagram of an audio video processing device provided in an embodiment of the present disclosure.

In addition, an embodiment of the present disclosure further provides an audio video processing device, with reference to FIG. 8, including:

a processor 801, a memory 802, an input apparatus 803, and an output apparatus 804. The processor 801 in the audio video processing device may include one or more processors, and one processor is shown as an example in FIG. 8. In some embodiments of the present disclosure, the processor 801, the memory 802, the input apparatus 803 and the output apparatus 804 can be connected by a bus or other means, wherein the connection by bus is shown as an example in FIG. 8.

The memory 802 can be used for storing software programs and modules, and the processor 801 can perform various functional applications and data processing of the audio video processing device by executing the software programs and modules stored in the memory 802. The memory 802 can mainly include a program storage region and a data storage region, wherein the program storage region can store an operating system, at least one application programs required for the functions, and the like. Further, the memory 802 can include a high speed random access memory as well as a non-volatile memory, such as at least one magnetic disk storage device, a flash memory device, or other volatile solid state storage device. The input apparatus 803 can be used for receiving input numeric or character information and generating signal inputs relating to user settings and function controls of the audio video processing device.

Specifically, in the present embodiment, the processor 801 loads executable files corresponding to processes of one or more application programs onto the memory 802 in accordance with the following instructions, and it is the processor 801 that executes the application programs stored in the memory 802, thereby implementing the above-mentioned various functions of the audio video processing device.

It should be noted that, in this document, relational terms such as "first", "second" and the like, are used merely to distinguish one entity or action from another entity or action without necessarily requiring or implying any actual such relationship or order between such entities or actions. Also, the term "comprise", "include" or any other variation thereof, is intended to cover a non-exclusive inclusion, such that a process, method, article, or device that comprises a series of elements includes not only those elements but also other elements not expressly listed or inherent to such process, method, article, or device. Without further limitation, an element defined by the phrase "comprising a . . . " does not exclude the presence of other identical elements in the process, method, article, or device that comprises the element.

The above are only particular embodiments of the present disclosure, such that those skilled in the art can understand or implement the present disclosure. Various modifications to these embodiments will be obvious to those skilled in the art, and the generic principles defined herein can be implemented in other embodiments without departing from the spirit or scope of the present disclosure. Thus, the present disclosure will not be limited to these embodiments shown herein but be accorded with the widest scope consistent with the principles and novel features disclosed herein.

What is claimed is:

1. An audio video processing method, the method comprising:

presenting text data corresponding to an audio video to be edited, wherein the text data has a mapping relationship with an audio video timestamp of the audio video to be edited;

presenting the audio video to be edited in accordance with a time axis track;

determining an audio video timestamp corresponding to target text data in the text data as a target audio video timestamp, in response to a preset operation triggered for the target text data; and processing an audio video clip corresponding to the target audio video timestamp in the audio video to be edited based on the preset operation, wherein the preset operation is triggered by:

presenting a first edit entry for invalid tone words or a preset silence clip, wherein the first edit entry corresponds to a first edit card, on which a one-click deletion control is provided;

displaying the invalid tone words or the preset silence clip in the text data in accordance with a second display style, in response to a trigger operation for the first edit entry; and deleting the invalid tone words or the preset silence clip from the text data, in response to a trigger operation for the one-click deletion control.

2. The method according to claim 1, wherein the method further comprises:

presenting a voice enhancement control on a second edit card;

performing an enhancement processing on human voice in the audio video to be edited, in response to a trigger operation for the voice enhancement control.

3. The method according to claim 1, wherein the method further comprises:

determining background music corresponding to the audio video to be edited based on at least one of a musical genre of the audio video to be edited or a content in the text data corresponding to the audio video to be edited;

adding the background music to the audio video clip to be edited.

4. The method according to claim 1, wherein the method further comprises:

presenting a loudness equalization control on a third edit card;

performing a normalization processing on loudness of a volume in the audio video to be edited, in response to a trigger operation for the loudness equalization control.

5. The method according to claim 1, wherein the method further comprises:

presenting an intelligent teaser control on a fourth edit card;

adjusting a music volume and a human voice volume in an audio video clip in the audio video to be edited within a previous preset time period, in response to a trigger operation for the intelligent teaser control, so as to obtain an audio video clip with adjusted volume, wherein the music volume is inversely proportional to the human voice volume in the audio video clip with adjusted volume.

6. The method according to claim 1, wherein the preset operation comprises a selection operation, and the processing an audio video clip corresponding to the target audio video timestamp in the audio video to be edited based on the preset operation comprises:

displaying the audio video clip corresponding to the target audio video timestamp in the audio video to be edited in accordance with a preset first display style.

7. The method according to claim 1, wherein the preset operation comprises a deletion operation, and the processing an audio video clip corresponding to the target audio video timestamp in the audio video to be edited based on the preset operation comprises:

deleting the audio video clip corresponding to the target audio video timestamp in the audio video to be edited based on the deletion operation.

8. The method according to claim 1, wherein the preset operation comprises a modification operation, and the processing an audio video clip corresponding to the target audio video timestamp in the audio video to be edited based on the preset operation comprises:

acquiring modified text data corresponding to the modification operation;

generating an audio video clip based on the modified text data and tone color information in the audio video to be edited, as an audio video clip to be modified;

performing replacement processing on the audio video clip corresponding to the target audio video timestamp in the audio video to be edited, by utilizing the audio video clip to be modified.

9. The method according to claim 1, wherein the method further comprises:

upon receiving an addition operation for first text data in the text data, generating a first audio video clip based on the first text data and tone color information in the audio video to be edited;

determining a first audio video timestamp corresponding to the first text data based on position information of the first text data in the text data;

adding the first audio video clip to the audio video to be edited, based on the first audio video timestamp.

10. A non-transitory computer readable storage medium having stored therein instructions that, when being executed on a terminal device, cause the terminal device to implement a method comprising:

presenting text data corresponding to an audio video to be edited, wherein the text data has a mapping relationship with an audio video timestamp of the audio video to be edited;

presenting the audio video to be edited in accordance with a time axis track;

determining an audio video timestamp corresponding to target text data in the text data as a target audio video timestamp, in response to a preset operation triggered for the target text data; and processing an audio video clip corresponding to the target audio video timestamp in the audio video to be edited based on the preset operation, wherein the preset operation is triggered by:

presenting a first edit entry for invalid tone words or a preset silence clip, wherein the first edit entry corresponds to a first edit card, on which a one-click deletion control is provided;

displaying the invalid tone words or the preset silence clip in the text data in accordance with a preset second display style, in response to a trigger operation for the first edit entry; and deleting the invalid tone words or the preset silence clip from the text data, in response to a trigger operation for the one-click deletion control.

11. The non-transitory computer readable storage medium according to claim 10, wherein the method further comprises:

presenting a voice enhancement control on a second edit card;

performing an enhancement processing on human voice in the audio video to be edited, in response to a trigger operation for the voice enhancement control.

12. The non-transitory computer readable storage medium according to claim 10, wherein the method further comprises:

determining background music corresponding to the audio video to be edited based on at least one of a musical genre of the audio video to be edited or a content in the text data corresponding to the audio video to be edited;

adding the background music to the audio video clip to be edited.

13. A device, comprising: a memory, a processor, and a computer program stored on the memory and executable on the processor, the processor, when executing the computer program, implementing a method comprising:

presenting text data corresponding to an audio video to be edited, wherein the text data has a mapping relationship with an audio video timestamp of the audio video to be edited;

presenting the audio video to be edited in accordance with a time axis track;

determining an audio video timestamp corresponding to target text data in the text data as a target audio video timestamp, in response to a preset operation triggered for the target text data; and processing an audio video clip corresponding to the target audio video timestamp in the audio video to be edited based on the preset operation, wherein the preset operation is triggered by:

presenting a first edit entry for invalid tone words or a preset silence clip, wherein the first edit entry corresponds to a first edit card, on which a one-click deletion control is provided;

displaying the invalid tone words or the preset silence clip in the text data in accordance with a preset second display style, in response to a trigger operation for the first edit entry; and deleting the invalid tone words or the preset silence clip from the text data, in response to a trigger operation for the one-click deletion control.

14. The device according to claim 13, wherein the method further comprises:

presenting a voice enhancement control on a second edit card;

performing an enhancement processing on human voice in the audio video to be edited, in response to a trigger operation for the voice enhancement control.

* * * * *